United States Patent [19]

Wedemeyer

[11] 3,976,749
[45] Aug. 24, 1976

[54] METHOD FOR PRODUCING PURE MONOCARBIDES, MONONITRIDES AND CARBONITRIDES

[75] Inventor: Horst Wedemeyer, Linkenheim, Germany

[73] Assignee: Gesellschaft fur Kernforschung m.b.H, Karlsruhe, Germany

[22] Filed: Dec. 21, 1973

[21] Appl. No.: 427,426

[30] Foreign Application Priority Data
Dec. 22, 1972   Germany............................ 2262868

[52] U.S. Cl................................ 423/251; 423/250; 423/252; 423/256; 423/440
[51] Int. Cl.² ................... C01G 56/00; C01F 15/00; C01G 43/00; C01R 31/34
[58] Field of Search ................. 423/5, 17, 249, 250, 423/251, 252, 253, 256, 260, 440; 252/301.1 R; 148/6.14 A

[56] References Cited
UNITED STATES PATENTS

| 2,771,340 | 11/1956 | Kamen................................. 23/14.5 |
| 2,896,930 | 7/1956 | Menke.................................. 423/17 |
| 2,933,369 | 4/1960 | Ritter.................................... 23/14.5 |
| 3,104,940 | 9/1963 | Bril ....................................... 423/10 |
| 3,334,974 | 8/1967 | Fletcher.............................. 423/256 |
| 3,377,141 | 4/1968 | Hardy .................................. 423/256 |
| 3,386,811 | 6/1968 | Hanson ................................ 423/256 |
| 3,399,979 | 9/1968 | Hamling.............................. 423/256 |
| 3,399,980 | 9/1968 | Bourdeau............................ 423/256 |
| 3,723,594 | 3/1973 | Proctor ............................... 423/250 |

FOREIGN PATENTS OR APPLICATIONS

| 1,223,353 | 8/1966 | Germany |
| 978,615 | 12/1964 | United Kingdom |

Primary Examiner—Benjamin R. Padgett
Assistant Examiner—Donald P. Walsh
Attorney, Agent, or Firm—Spencer & Kaye

[57] ABSTRACT

Pure monocarbides, or pure mononitrides or carbonitrides of metals are prepared by first forming a mixture of carbon with an oxalate of the metals and thermally decomposing the metal oxalate in the presence of the carbon by a stream of hydrogen. The hydrogen is removed and monocarbides are then formed by heating the decomposition products in vacuo to carbothermally reduce them. Mononitrides and carbonitrides can be formed by replacing the hydrogen with nitrogen and heating the decomposition products in the nitrogen.

39 Claims, No Drawings

METHOD FOR PRODUCING PURE MONOCARBIDES, MONONITRIDES AND CARBONITRIDES

BACKGROUND OF THE INVENTION

The present invention relates to a method for producing pure monocarbides, or pure mononitrides or carbonitrides of one or a plurality of the metals titanium, vanadium, zirconium, niobium, molybdenum, hafnium, tantalum, tungsten, thorium, uranium, plutonium, or americium.

Carbides, nitrides and carbonitrides are gaining more and more importance in the high-temperature art. The thermodynamically most stable and technically most interesting carbides are formed practically exclusively from the transition metals of the IVth, Vth and VIth groups of the Periodic Table, as well as from the actinide elements. In addition to tungsten carbide (WC) and titanium carbide (TiC), such compounds as niobium carbide (NbC), tantalum carbide (TaC), vanadium carbide (VC) and molybdenum carbide (MoC) are increasingly used as solid phases in hard metals. Also, carbide cermets are used in the manufacture of gas turbines. Further, significant improvements in mechanical properties are obtained for composite metallic materials with fibers, e.g. whisks, of SiC, $B_4C$ and ZrC.

The prior art has also used nitrides as hard substances, e.g. for protective tubes around thermoelements, crucibles, etc. Previously, carbides were produced by carburizing the powdered metals or by reducing the oxides with carbon. In the past, nitrides were manufactured by nitrating metal oxides in the presence of carbon, by nitrating metals, by decomposing ammonia compounds or by deposition from the gaseous phase.

High demands are placed on nuclear fuels for high output nuclear reactors such as fast breeder reactors. For example, the nuclear fuel elements must be extremely pure and compatible with fuel element cladding materials. Typical of such cladding materials are stainless steels.

At the high operating temperatures (700°C and more) and the desired long fuel element service life which result in high fuel consumption (80,000 to 100,000 megawatt.days per ton or more) prior experience has shown that carbides and nitrides of uranium and plutonium are preferable to the corresponding oxides as nuclear fuels.

It has been found that of the carbides and nitrides, the monocarbides and the mononitrides show the best compatibility with the cladding materials used in nuclear reactors.

In the past, the manufacture of pure uranium monocarbide (UC), or pure uranium mononitride (UN) from uranium oxide has been effected by a number of different methods. For example, in one method, uranium oxide is reduced to metallic uranium with the aid of calcium. The metallic uranium is then reacted in comminuted form, e.g. in the form of chips or powder, at approximately 1000°C with methane according to the formula:

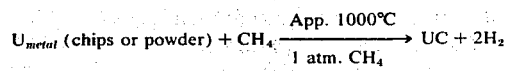

In another prior art method, after the metallic uranium is formed, it is reacted with nitrogen at less than 1000°C and the reaction product is subsequently disproportionated in a vacuum at temperatures over 1000°C to UN and nitrogen according to the formula:

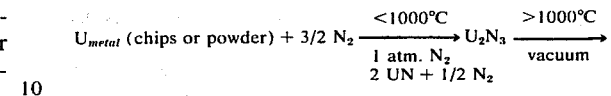

These manufacturing processes, however, are not economically feasible and are unsuited for commercial utilization where production of larger quantities of fuel is required.

It is also known to precipitate ammonium diuranate (ADU) and/or ammonium uranyl carbonate (AUC) from aqueous solutions containing uranium (VI) ions. For example, ammonium diuranate can be precipitated from uranyl nitrate solutions containing nitric acid by adding ammonia. Similarly, ammonium uranyl carbonate (AUC) can be precipitated from uranyl nitrate solutions containing nitric acid by adding ammonium carbonate. The resulting deposits are then separated from the solution, dried and calcined (See, for example, British Pat. No. 1,096,592). The calcined deposit can then be reduced to uranium dioxide. Uranium/plutonium dioxide can be produced in a similar manner. Uranium dioxide produced according to the ADU/AUC method, however, produces only impure reaction products when it is mixed with carbon and reacted by carbothermal reduction to form uranium monocarbide or when it is mixed with carbon and reacted in a stream of nitrogen to form uranium mononitride. The uranium dioxide used as the reaction compound is superstoichiometric ($UO_{2+x}$) and slow to react, a so-called altered oxide. Analytical difficulties make it impossible to accurately determine oxygen in the oxide. This determination is required to calculate the quantity of carbon to be added, and thus the required uranium oxide/carbon mixture cannot be produced with precision. For this reason, and due to the partial formation of carbon dioxide during the carbothermal reduction, the resulting uranium monocarbides contain many impurities in the form of uranium dicarbides ($UC_2$) as a second phase in the range of several percent by weight. The $UC_2$ must be converted to uranium sesquicarbide ($U_2C_3$) by further thermal treatment because the uranium sesquicarbide exhibits a better compatibility behavior with respect to cladding materials than does the dicarbide. The oxygen impurities in the resulting carbides amount to approximately 0.4 to 0.5 percent by weight. For similar reasons, the production of uranium mononitride also does not result in a single-phase reaction product. Oxygen impurities in the mononitrides are frequently present in the form of uranium dioxide as the second phase in the range of a few percent by weight. Free carbon is also frequently found in the monocarbide and mononitride end products. Moreover, temperatures in the area of 1700° to 1800°C are required for the carbothermal reduction in vacuo and for the reaction in a stream of nitrogen.

It has also been proposed to treat a solution containing uranium (IV) and plutonium (III) ions with a solution containing oxalate ions to precipitate a mixture of U(IV) and Pu(III) oxalates from the solution (German Published Patent Appln. No. 1,223,353). The precipitates deposit easily and can be filtered easily. The precipitated oxalates are then calcined in air and are reduced with the aid of hydrogen to a mixture of uranium and plutonium dioxide or are calcined directly in nitrogen or hydrogen with the formation of dioxides. The dioxides resulting in this manner are altered dioxides, are slow to react, and require high reaction temperatures to be converted to monocarbides or mononitrides.

It is therefore a primary object of the present invention to provide a process with which the drawbacks of the known methods can be avoided and highly pure monocarbides, mononitrides and carbonitrides of the metals of the group including titanium, vanadium, zirconium, niobium, molybdenum, hafnium, tantalum, tungsten, thorium, uranium, plutonium, or americium can be produced simply, safely and economically at relatively low temperatures in degrees of purity which can be reproduced

SUMMARY OF THE INVENTION

It has now been found in accordance with the present invention that pure monocarbides can be produced by (a) forming a mixture of carbon with an oxalate of at least one of the metals titanium, vanadium, zirconium, niobium, molybdenum, hafnium, tantalum, tungsten, thorium, uranium, plutonium or americium; (b) decomposing the metal oxalate in the presence of carbon in a stream of a hydrogen containing gas with addition of heat; (c) removing the hydrogen containing gas; and (d) heating the decomposition products in vacuo immediately after removal of the hydrogen containing gas to an elevated temperature to carbothermally reduce the decomposition products and form the monocarbide.

Preferably, uranium and/or plutonium metal oxalates are formed by adding oxalate ions to an aqueous solution containing nitrate ions, uranium and/or plutonium. The metal oxalate precipitates out of solution as a finely crystalline hydrate, is separated from the solution, and preferably is purified by washing and drying in vacuo. The highly purified oxalate crystals preferably are decomposed in the presence of carbon and hydrogen gas in a reaction furnace at a temperature of more than 600°C and most preferably 750°C to 800°C. The hydrogen gas is evacuated and pure-phase uranium and/or plutonium monocarbides are obtained by carbothermally reducing the decomposition products by maintaining the vacuum and raising the temperature preferably to a temperature of between 1100°C and 1300°C, and most preferably to 1250° to 1300°C. The resulting single-phase uranium and/or plutonium monocarbide preferably is cooled in vacuo.

In another aspect of the present invention, pure mononitrides and carbonitrides of the above metals can be produced by (a) forming a mixture of carbon with an oxalate of at least one of the metals; (b) decomposing the metal oxalate in the presence of carbon in a stream of a hydrogen containing gas with addition of heat; (c) removing the hydrogen containing gas; and (d) feeding a nitrogen stream into contact with the decomposition products and heating the decomposition products in the nitrogen stream at an elevated temperature.

Preferably, uranium and/or plutonium mononitrides and carbonitrides are formed from uranyl and/or plutonium oxalates, which oxalates are formed and thermally decomposed in the same manner as described above. When forming mononitrides, the decomposition products are heated in the nitrogen stream to a temperature of more than 1500°C, most preferably 1750° to 1800°C, until the production of carbon monoxide is complete.

When forming carbonitrides, the decomposition products are preferably heated in the nitrogen stream at a temperature of about 1500°C.

The process of the present invention enables metal oxides having a stoichiometric ratio of metal to oxygen to be formed during the decomposition of the metal oxalate so the amount of carbon needed to prepare the single-phase end products of the present invention without formation of an unwanted second phase can thus be easily determined for each metal without resort to analytical oxygen determination of specific batches of metal oxides. Further, the present invention enables lower temperatures to be used for the carbothermal reduction of such oxides as $UO_2$.

DETAILED DESCRIPTION OF THE INVENTION

In accordance with the invention, a metal oxalate of at least one of the metals titanium, vanadium, zirconium, niobium, molybdenum, hafnium, tantalum, tungsten, thorium, uranium, plutonium and americium is formed. The metal oxalate can be an oxalate of only one of these metals or a mixture of two or more different metal oxalates. The metal oxalate can be formed in a conventional manner such as, for example, by adding oxalate ions to an aqueous solution containing the metal in the form of a metal compound such as a soluble metal salt or elemental metal. Oxalate ions can be provided in the metal containing solution in conventional manner such as by adding an aqueous oxalic acid solution to it.

Upon addition of oxalate ions to the aqueous metal containing solution, the metal oxalate is formed and easily precipitates from the solution, usually as a finely crystalline, hydrated crystal containing water of crystallization. The precipitated metal oxalates can be easily separated from the aqueous solution in conventional manner such as by decantation and/or filtration.

Differences in the solubility of the metal oxalates in the solution from which they are precipitated have practically no effect on the method of this invention because the filtrate can be recycled and can be mixed with fresh solutions containing the same metal ions. Thus, whether the oxalate precipitation is complete or not, pure oxalates are obtained without incurring the loss of metal ions.

The transfer of the metals to their oxalates results in a prepurification, i.e. a separation of a major quantity of impurities which in the production of monocarbides, mononitrides or carbonitrides according to the known methods are carried along at least partially into the desired end product. After the metal oxalates are separated from the solution, they preferably are given a fine cleansing to remove residual quantities of carried-along solution substances. This final purification of the metal oxalates can be easily and simply accomplished by, for example, water rinsing the metal oxalates one or two or more times and then drying them in vacuo. In the production of uranyl oxalate for example, after one or two rinses in water, the metal oxalates are dried and residual impurities such as oxalic acid or nitric acid are sublimated out in vacuo at approximately 130° to 150°C.

In a preferred embodiment of the invention a metal oxalate of uranium and/or plutonium is formed. These metal oxalates can be formed from an aqueous solution by adding oxalate ions to precipitate the metal oxalate. It is preferred to form these metal oxalates by adding oxalate ions in the form of oxalic acid to an aqueous solution containing nitrate ions, provided for example by nitric acid, and uranium and/or plutonium. When the oxalate ions are added, finely crystalline uranyl and/or plutonium oxalate hydrate precipitates from the solution. The precipitate can be easily separated from the solution, washed and then dried in vacuo free of impurities.

When it is desired to produce plutonium monocarbide, it is preferred to form plutonium (IV) oxalate because it is easily precipitated from a nitric acid solution at 50° to 75°C as a dihydrate in a defined, crystalline form.

In accordance with the invention, the metal oxalate is mixed with carbon. Preferably, the highly purified metal oxalate crystals are briefly ground together with carbon to form a homogeneous mixture and the mixture is then pressed into a pellet. The metal oxalate that is mixed with carbon can comprise an oxalate of one metal, or a mixture of two or more different metal oxalates.

When producing pure monocarbides, the metal oxalate crystals are mixed with carbon at a mole ratio of 1 to 3. When producing pure mononitrides, the metal oxylate crystals are mixed with carbon at a mole ratio of 1 to 2. Pure carbonitrides are produced by mixing the oxalate crystals with carbon at a mole ratio between 1 to 2 and 1 to 3. Preferably an $UO_2$ (as oxalate) to carbon ratio of 1 to 2.5 is used to produce a carbonitride of the form $UC_{1-x}N_x$ with $x = 0.5$.

When producing metal carbides, nitrides or carbonitrides other then those uranium compounds the ratio of metaloxide to carbon depends in general on the state of oxidation of the metal ion in the oxide, and on the chemical reaction of the carbothermic reduction.

In accordance with the invention, the metal oxalate-carbon mixture is heated and contacted with a stream of hydrogen to decompose the metal oxalate. The hydrogen stream can comprise hydrogen alone or a mixture of hydrogen and an inert gas such as argon. The decomposition reaction preferably is conducted in a reaction furnace at a temperature of more than 600°C, and preferably at a temperature of between 750°C and 800°C. Generally, the decomposition reaction is carried out for about 1 to 2 hours.

The decomposition products of the present invention prepared by the thermal decompositions, in a hydrogen atmosphere, of a mixture of carbon and metal oxalate generally comprise a metal oxide having a stoichiometric ratio of oxygen to metal. For example, $UO_2$ formed from its metal oxalate in accordance with the present invention has a stoichiometric ratio of oxygen to uranium of 2 to 1 and can be reproduceably produced in this ratio so that analytical oxygen determination is not required. Thus, the ratio of carbon to oxygen is always the same before the formation of monocarbide, mononitride or carbonitride. This prevents the formation of a second phase, such as, for example, that of a dicarbide.

Upon completion of the decomposition reaction, the hydrogen stream is removed immediately from the reaction furnace.

When pure-phase monocarbides are to be produced, the reaction furnace immediately is evacuated to remove the hydrogen stream and the decomposition products are heated immediately after the hydrogen removal at an elevated temperature in vacuo to carbothermally reduce the decomposition products to monocarbides. Generally, the carbothermal reduction is carried out at a temperature of between 1100° and 1300°C, and preferably is carried out at a temperature of 1250° to 1300°C. Usually, the carbothermal reduction reaction is allowed to proceed for about 3 to 4 hours to obtain substantially complete carbonization but other times can also be used. The resulting monocarbide has single-phase and is cooled in vacuo to room temperature. Preferably, if the reaction furnace is not connected with a protective gas box, the pyrophority of the monocarbide must be reduced before cooling by subjecting it to a short annealing treatment at a temperature of more than 1600°C for a period of approximately 30 minutes.

The production of plutonium monocarbide in accordance with the present invention prevents the relatively high loss of plutonium which had previously occurred in other manufacturing processes.

The carbothermal reductions of the present invention can occur at temperatures substantially lower than those used in the prior art. Thus, the thermal decomposition in a hydrogen atmosphere of uranyl oxalate mixed homogeneously with carbon to produce a very well reacting stoichiometric uranium dioxide, which, upon removal of the hydrogen, reacts with the carbon to form uranium monocarbide at temperatures which are substantially lower than previously known for $UO_2$. According to H. C. Greenwood, referred to in "Gmelins Handbuch der anorganischen Chemie", [Handbook of Inorganic Chemistry by Gmelin System No. 55 - Uranium, 8th edition, 1936, reprinted 1955, page 87] the beginning of reduction of a mixture of $UO_2$ and carbon which is heated in vacuo lies at approximately 1480° C. In contrast, the carbothermal reduction of the present invention can be carried out at temperatures of 1100°C to 1300°C.

When pure phase mononitrides or carbonitrides are to be produced, the hydrogen stream used in the decomposition reaction is replaced with a stream of nitrogen and the decomposition products are contacted with the nitrogen stream at an elevated temperature to form the mononitrides or carbonitrides. The hydrogen stream can be removed from the reaction furnace by pumping out the hydrogen or evacuating the reaction furnace and then adding the nitrogen stream or by feeding the nitrogen stream into the reaction furnace and then stopping the hydrogen flow into the furnace. The nitrogen stream that is fed into contact with the decomposition products can be nitrogen alone or a mixture of nitrogen with a gas that is inert under the reaction conditions. Generally, to produce mononitrides the reaction with nitrogen is carried out at a temperature of more than 1500°C and preferably at a temperature of 1750° to 1800°C. The reaction to produce mononitrides is usually carried out until the production of carbon monoxide is substantially completed as determined by a CO content of the nitrogen flowing out of the reaction furnace of less than 2 ppm CO. The reaction of nitrogen with the decomposition products to produce carbonitrides is generally carried out at a temperature of about 1500°C. The total time of the reaction depends on the batch-size.

The resulting mononitrides and nitrocarbides preferably are cooled in the nitrogen stream to about 1350°C and then to room temperature in vacuo.

The present invention will be explained below with the aid of examples without being limited to these particular examples.

EXAMPLE 1

Pure uranium monocarbide is produced by first precipitating uranyl oxalate trihydrate $UO_2C_2O_4 \cdot 3H_2O$ from a nitric acid solution of any uranium compound (for instance $UO_2$) with an aqueous solution of oxalic acid. Precipitation temperature is found to be favourable at about 70°C.

The precipitate is washed with water and then dried at 130°C. The particle size distribution of the oxalate crystals is determined by sedimentation analysis and the results of this determination are as follows:

| Particle Size | Amount |
| --- | --- |
| 0 to 5 $\mu$ | 7.2% |
| > 5 to 25 $\mu$ | 47.2% |
| > 25 to 60 $\mu$ | 27.0% |
| > 60 $\mu$ | 18.6% |

The oxalate crystals are mixed with graphite powder at a mole ratio of 1 to 3 and ground for a few minutes. The powder is homogeneously mixed in this way and then pressed into pellets of about 2 grams in weight. The pellets are placed in a reaction furnace where they are initially heated to 750°C to 800°C in a stream of a mixture of hydrogen and argon for about 1 to 2 hours. The hydrogen/argon stream is removed and the reaction furnace is evacuated to form a vacuum therein. The temperature of the furnace is now raised to 1250°C to 1300°C, and the pellets are heated at this temperature for 3 to 4 hours while maintaining the vacuum to produce a carbothermal reduction. The pellets are then annealed at 1600° to 1700°C for one-half hour to reduce their pyrophority and condense the carbide powder and produce a strong grain growth. The resulting uranium monocarbide is cooled and then examined. A radiographic and metallographic analysis shows single-phase reaction products in all pellets. A chemical analysis of the nonmetallic impurities shows that the pellets contain about 2000 to 2500 ppm oxygen and about 200 to 400 ppm nitrogen.

EXAMPLE 2

Pure uranium mononitride is prepared by mixing uranium oxalate crystals, obtained as in Example 1, with powdered graphite at a mole ratio of 1 to 2. The graphite and oxalate crystals are ground together for a few minutes to produce a homogeneous mixture. Pellets of a weight of about 2 grams are pressed from the powder mixture, as in Example 1, and are placed in a reaction furnace where they are heated initially to about 700°C in a stream of a mixture of hydrogen and argon for about 1 to 2 hours. The hydrogen/argon mixture is replaced with a nitrogen stream, and the pellets are heated in the stream of nitrogen (either nitrogen alone or a mixture of nitrogen and an inert gas) at 1750° to 1800°C for 3 to 4 hours. After 3 to 4 hours the content of carbon monoxide (CO) produced during the nitride formation in the gas mixture flowing out of the furnace has dropped to less than 2 ppm CO. The reaction product is cooled in a stream of nitrogen to about 1350°C, and the nitride is then brought to room temperature in vacuo. A radiographic and metallographic analysis shows single-phase reaction products for all pellets. Chemical analysis shows nonmetallic impurities in such small quantities as 800 to 1500 ppm oxygen and less than 100 to 250 ppm carbon.

The times mentioned in Examples 1 and 2 for the oxalate decomposition and carbothermal reduction are based on the technical design of the furnace employed.

EXAMPLE 3

An aqueous tantalate solution, or a water suspension containing a tantalum oxide forming compound is mixed with an aqueous oxalic acid solution to precipitate a tantalum oxalate complex over a pH of from about 3 to about 5. The resulting oxalate crystals are mixed with carbon as described in Example 1 at a mole ratio of $Ta_2O_5 : C = 2 : 7$ and pressed into 2 gram pellets. The pellets are heated in a reaction furnace to about 800°C in a stream of a mixture of hydrogen and argon for about 1 to 2 hours. The hydrogen/argon mixture is removed and the reaction furnace is evacuated. The temperature of the furnace is raised to about 1500°C and the pellets are heated at this temperature for some hours while maintaining the vacuum to produce a carbothermal reduction. The pellets are then annealed at 1600° to 1700°C for one-half hour after which the resulting tantalum monocarbide is cooled to room temperature.

Tantalum mononitride can be formed in a similar manner by using $Ta_2O_5$ to carbon ratio in the range of $Ta_2O_5 : C = 2 : 7$ to $2 : 5$ and using a nitrogen stream similar to example 4.

EXAMPLE 4

Pure uranium carbonitride is prepared by mixing uranium oxalate crystals, obtained as in Example 1, with powdered graphite at a mole ratio of $UO_2 : C = 1 : 3$ to $1 : 2$. The graphite and oxalate crystals are ground together a few minutes to produce a homogeneous mixture. Pellets of a weight of about 2 grams are pressed from the powder mixture as in Example 1, and are placed in a reaction furnace where they are heated initially to about 700°C, in a stream of a mixture of hydrogen and argon for about 1 to 2 hours. The hydrogen/argon mixture is replaced with a nitrogen stream, and the pellets are heated in the stream of nitrogen (either nitrogen alone or a mixture of nitrogen and an inert gas) at about 1500°C for some hours. The total time of the reaction depends on the batch-size. The reaction is substantially completed as determined by a CO content of the nitrogen flowing out of the furnace of less than 2 ppm CO. The reaction product is then cooled to room temperature.

It will be understood that the above description of the present invention is susceptible to various modifications, changes and adaptations, and the same are intended to be comprehended within the meaning and range of equivalents of the appended claims.

I claim:

1. A method of producing pure monocarbides of at least one of the metals titanium, vanadium, zirconium, niobium, molybdenum, hafnium, tantalum, tungsten, thorium, uranium, plutonium, or americium comprising:
   a. forming a mixture of carbon with an oxalate of at least one of said metals;
   b. decomposing the metal oxalate in the presence of carbon in a stream of a hydrogen containing gas with addition of heat;
   c. removing the hydrogen containing gas; and d. heating the decomposition products immediately after removal of the hydrogen containing gas to an elevated temperature in vacuo to carbothermally reduce the decomposition products and from the monocarbide.

2. The method according to claim 1 wherein the metal oxalate is uranyl oxalate which is decomposed to $UO_2$ having a stoichiometric 2 to 1 ratio of oxygen to uranium.

3. The method according to claim 2 wherein the uranyl oxalate is mixed with carbon at a mole ratio of $UO_2$ to carbon of 1 to 3.

4. The method according to claim 2 wherein the carbothermal reduction takes place at a temperature between about 1100°C and 1300°C.

5. The method according to claim 1 wherein the metal oxalate is plutonium oxalate which is decomposed to plutonium dioxide having a stoichiometric 2 to 1 ratio of oxygen to plutonium.

6. The method according to claim 5 wherein the plutonium oxalate is mixed with carbon at a mole ratio of $PuO_2$ to carbon of 1 to 3.

7. The method according to claim 1 including converting at least one of said metals to its oxalate, purifying the oxalate, and forming a homogeneous mixture of the oxalate with carbon.

8. The method according to claim 7 wherein uranyl and/or plutonium oxalates are formed in an aqueous solution containing uranium and/or plutonium by addition of oxalate ions, and the resulting metal oxalates are separated from the solution and dried.

9. The method according to claim 8 wherein the aqueous solution contains nitrate ions, and the oxalates are crystal hydrates which are separated from the solution, rinsed, and dried and freed from impurities in vacuo before they are mixed with carbon.

10. The method according to claim 9 wherein the metal oxalate crystals are decomposed in a reaction furnace at a temperature of more than 600°C in a stream of hydrogen or a stream of hydrogen and an inert gas, and the reaction furnace is evacuated immediately after the decomposition.

11. The method according to claim 10 wherein the carbothermal reduction occurs immediately after removal of the hydrogen containing gas while maintaining a vacuum in a temperature range between about 1100° and about 1300°C.

12. The method according to claim 8 wherein the metal oxalate is mixed with carbon at a mole ratio of metaloxide to carbon of 1 to 3.

13. The method according to claim 10 wherein the decomposition of the metal oxalate takes place at a maximum temperature between about 750° and about 800°C.

14. The method according to claim 11 wherein the carbothermal reduction takes place at a temperature of 1250° to 1300°C.

15. A method for producing pure mononitrides or carbonitrides of at least one of the metals titanium, vanadium, zirconium, niobium, molybdenum, hafnium, tantalum, tungsten, thorium, uranium, plutonium, or americium, comprising:
    a. forming a mixture of carbon with an oxalate of at least one of said metals;
    b. decomposing the metal oxalate in the presence of carbon in a stream of a hydrogen containing gas with the addition of heat;
    c. removing the hydrogen containing gas and feeding a nitrogen stream into contact with the decomposition products; and
    d. heating the decomposition products immediately after removal of the hydrogen containing gas in the nitrogen stream.

16. The method according to claim 15 wherein the metal oxalate is mixed with carbon at a mole ratio of metaloxide to carbon of 1 to 2 to produce pure mononitrides.

17. The method according to claim 16 wherein the decomposition products are heated with the nitrogen at a temperature greater than 1500°C.

18. The method according to claim 16 wherein the decomposition products are heated with the nitrogen in a reaction furnace at a temperature of about 1750° to about 1800°C until the CO content of the nitrogen flowing out of the furnace is less than 2ppm CO.

19. The method according to claim 15 wherein pure carbonitrides are produced by mixing the metal oxalate with carbon at a mole ratio of metaloxide to carbon between 1 to 2 and 1 to 3 and the decomposition products are heated with nitrogen at a temperature of about 1500°C.

20. The method according to claim 15 wherein the stream of nitrogen consists of nitrogen alone or of a mixture of nitrogen and a gas which is inert under the reaction conditions.

21. The method according to claim 15 wherein the metal oxalate is uranyl oxalate which is decomposed to $UO_2$ having a stoichiometric 2 to 1 ratio of oxygen to uranium.

22. The method according to claim 21 wherein the uranyl oxalate is mixed with carbon at a mole ratio of $UO_2$ to carbon of 1 to 2 and the decomposition products are heated with nitrogen at a temperature of more than 1500°C.

23. The method according to claim 15 wherein the metal oxalate is plutonium oxalate which is decomposed to plutonium dioxide having a stoichiometric 2 to 1 ratio of oxygen to plutonium.

24. The method according to claim 23 wherein the plutonium oxalate is mixed with carbon at a mole ratio of $PuO_2$ to carbon of 1 to 2 and the decomposition products are heated with nitrogen at a temperature of more than 1500°C.

25. The method according to claim 15 including converting at least one of said metals to its oxalate, purifying the oxalate, and forming a homogeneous mixture of the oxalate with carbon.

26. The method according to claim 25 wherein uranyl and/or plutonium oxalates are formed in an aqueous solution containing uranium and/or plutonium by addition of oxalate ions, and the resulting metal oxalates are separated from the solution and dried.

27. The method according to claim 26 wherein the aqueous solution contains nitrate ions, and the oxalates are crystal hydrates which are separated from the solution, rinsed and dried and freed from impurities in vacuo before they are mixed with carbon.

28. The method according to claim 27 wherein the metal oxalate crystals are decomposed in a reaction furnace at a temperature of more than 600°C in a stream of hydrogen or a stream of hydrogen and an inert gas.

29. The method according to claim 28 wherein a single-phase mononitride is produced and the decomposition products are heated to a temperature of more than 1500°C in the nitrogen stream until the formation of carbon monoxide is completed.

30. The method according to claim 29 wherein after the formation of carbon monoxide is completed, the resulting singlephase mononitride is initially cooled in a stream of nitrogen to about 1350°C and then is cooled to room temperature in vacuo.

31. The method according to claim 25 wherein the oxalate crystals are mixed with carbon at a mole ratio of metaloxide to carbon of 1 to 2 to produce pure mononitrides.

32. The method according to claim 28 wherein the decomposition of the metal oxalate takes place at a maximum temperature between about 750° and about 800°C.

33. The method according to claim 29 wherein the heating of the decomposition products in the stream of nitrogen occurs at 1750° to 1800°C until the CO content of the nitrogen flowing out of the furnace is less than 2ppm CO.

34. The method according to claim 25 wherein pure carbonitrides are produced by mixing the metal oxalate with carbon at a mole ratio of metaloxide to carbon, between 1 to 2 and 1 to 3 and the decomposition products are heated with a nitrogen at a temperature of about 1500°C.

35. The method according to claim 25 wherein the stream of nitrogen consists of nitrogen alone or of a mixture of nitrogen and a gas which is inert under the reaction conditions.

36. A method for producing pure monocarbides of at least one of the metals titanium, vanadium, zirconium, niobium, molybdenum, hafnium, tantalum, tungsten, thorium, uranium, plutonium, or americium, comprising:
 a. converting at least one of the metals to its oxalate;
 b. cleaning the oxalate;
 c. forming a homogeneous mixture of the oxalate with carbon;
 d. decomposing the oxalate in the presence of carbon in a stream of hydrogen or in a stream of a mixture of hydrogen and an inert gas with the addition of heat;
 e. removing the hydrogen containing stream; and
 f. heating the decomposition products in vacuo in a multi-stage heat treatment immediately after removal of the hydrogen containing stream to carbothermally reduce the decomposition products and form the monocarbide.

37. The method according to claim 36 wherein a monocarbide useful as a high output nuclear fuel is prepared by mixing an aqueous solution of uranium and/or plutonium compounds with oxalate ions, and the resulting oxalate precipitate is separated from the solution, and dried.

38. A method for producing pure mononitrides or carbonitrides of at least one of the metals titanium, vanadium, zirconium, niobium, molybdenum, hafnium, tantalum, tungsten, thorium, uranium, plutonium or americium comprising:
 a. converting at least one of the metals to its oxalate;
 b. cleaning the oxalate;
 c. forming a homogeneous mixture of the oxalate with carbon;
 d. decomposing the oxalate in the presence of carbon in a stream of hydrogen or in a stream of hydrogen and an inert gas with the addition of heat;
 e. removing the hydrogen containing stream; and
 f. heating the decomposition products immediately after removal of the hydrogen containing stream in the stream of nitrogen in a multi-stage heat treatment.

39. The method according to claim 38 wherein a mononitride useful as a high output nuclear fuel is prepared by mixing aqueous solutions of uranium and/or plutonium compounds with oxalate ions, and the resulting oxalate precipitate is separated from the solution and dried.

* * * * *